US012606720B2

(12) United States Patent
Kong et al.

(10) Patent No.: US 12,606,720 B2
(45) Date of Patent: Apr. 21, 2026

(54) TEMPORARY SHEET BONDING METHOD AND APPARATUS

(71) Applicant: CORNING INCORPORATED, Corning, NY (US)

(72) Inventors: Bokyung Kong, Hwasung-city (KR); JooYoung Lee, Asan-si (KR); Joohye Oh, Cheonan-si (KR); Yujin Shin, Asan-si (KR); Kwangje Woo, Suwon-si (KR)

(73) Assignee: CORNING INCORPORATED, Corning, NY (US)

( * ) Notice: Subject to any disclaimer, the term of this patent is extended or adjusted under 35 U.S.C. 154(b) by 33 days.

(21) Appl. No.: 18/714,880

(22) PCT Filed: Dec. 2, 2022

(86) PCT No.: PCT/US2022/051659
§ 371 (c)(1),
(2) Date: May 30, 2024

(87) PCT Pub. No.: WO2023/114026
PCT Pub. Date: Jun. 22, 2023

(65) Prior Publication Data
US 2025/0026963 A1 Jan. 23, 2025

(30) Foreign Application Priority Data

Dec. 14, 2021 (KR) ........................ 10-2021-0178813

(51) Int. Cl.
*C09J 5/02* (2006.01)
(52) U.S. Cl.
CPC ........... *C09J 5/02* (2013.01); *C09J 2301/408* (2020.08); *C09J 2301/50* (2020.08); *C09J 2400/146* (2013.01)

(58) Field of Classification Search
CPC .... C09J 5/02; C09J 2301/50; C09J 2301/408; C09J 2400/146
See application file for complete search history.

(56) References Cited

U.S. PATENT DOCUMENTS

| | | | |
|---|---|---|---|
| 4,191,606 A | 3/1980 | Evans | |
| 2011/0061804 A1 | 3/2011 | Hasegawa et al. | |

(Continued)

FOREIGN PATENT DOCUMENTS

| | | | |
|---|---|---|---|
| CN | 106892575 A | 6/2017 | |
| CN | 206356201 U | 7/2017 | |

(Continued)

OTHER PUBLICATIONS

Machine translation of KR20180021547A.*

(Continued)

*Primary Examiner* — Vishal I Patel
(74) *Attorney, Agent, or Firm* — Ryan T. Hardee

(57) ABSTRACT

A temporary sheet bonding method includes dip-coating temporary bonding layer 200 on a first sheet 100 by dipping the first sheet into a bonding solution comprising a surfactant and temporarily bonding the second sheet 300 to the first sheet via the temporary bonding layer. The surfactant includes cetyltrimethylammonium bromide or poly[(3-methyl-1-vinylimidazolium chloride)-co-(1-vinylpyrrolidone)]. A sheet dip coating apparatus includes a bonding solution bath 410 in which a bonding solution containing a surfactant is contained, a cassette 430 into which a plurality of first sheets are to be loaded, and a driver configured to move the cassette up/down. The driver sequentially moves the cassette down to immerse the first sheet in the bonding solution, the cassette up until the plurality of first sheets are removed from the bonding solution, and the cassette up and away from a surface of the bonding solution.

12 Claims, 5 Drawing Sheets

(56) References Cited

U.S. PATENT DOCUMENTS

| | | | |
|---|---|---|---|
| 2014/0342148 | A1 | 11/2014 | Bookbinder et al. |
| 2016/0122602 | A1 | 5/2016 | Oliver et al. |
| 2020/0171799 | A1 | 6/2020 | Adib et al. |
| 2020/0392040 | A1* | 12/2020 | Acquard ................. C03C 27/10 |

FOREIGN PATENT DOCUMENTS

| | | | | |
|---|---|---|---|---|
| CN | 111372903 | A | 7/2020 | |
| JP | 2007-317932 | A | 12/2007 | |
| KR | 10-2011-0029081 | A | 3/2011 | |
| KR | 10-1413626 | B1 | 8/2014 | |
| KR | 10-2018-0021547 | A | 3/2018 | |
| KR | 20180021547 | A * | 3/2018 | ............. H01L 21/18 |
| KR | 10-2018-0084947 | A | 7/2018 | |
| KR | 10-2019-0010991 | A | 2/2019 | |
| KR | 10-2020-0081496 | A | 7/2020 | |

| | | | | |
|---|---|---|---|---|
| TW | 201318046 | A | 5/2013 | |
| WO | 2008/061736 | A2 | 5/2008 | |
| WO | WO-2017087745 | A1 * | 5/2017 | ............... B32B 7/06 |

OTHER PUBLICATIONS

International Search Report and Written Opinion of the International Searching Authority; PCT/US2022/051659; dated May 26, 2023; 15 pages; US Patent Office.

Korean Patent Application No. 10-2021-0178813 , Office Action dated Oct. 28, 2025, 13 pages (English Translation only), Korean Patent Office.

Chinese Patent Application No. 202280081270.2, Office Action dated Dec. 17, 2025, 4 pages (English Translation only), Chinese Patent Office.

Extended European search report, EP application No. 22908230.0, dated Feb. 2, 2026, 5 pages, European Patent Office.

* cited by examiner 100
430
420
411
410

Dip coating 200
100
411

TEMPORARY SHEET BONDING METHOD AND APPARATUS

PRIORITY

This application is a national stage entry under 35 U.S.C. § 371 of International Application No. PCT/US2022/051659, filed on Dec. 2, 2022, which claims the benefit of priority under 35 U.S.C. § 119 of Korean Patent Application Serial No. 10-2021-0178813 filed on Dec. 14, 2021, the content of each of which is relied upon and incorporated herein by reference in its entirety.

BACKGROUND

The present disclosure relates to embodiments of a method and apparatus for bonding sheets and, more particularly, to embodiments of a temporary sheet bonding method and apparatus for temporarily bonding sheets so that the temporarily bonded sheets can be separated without being damaged after a process has been completed.

DESCRIPTION OF RELATED ART

Sheets, in particular, glass sheets, are used as substrates in a variety of devices, such as a lighting device and a display device. The thickness of a glass sheet directly affects the overall thickness and weight of a display device or the like. Thus, there has been demand for thinner glass sheets. In particular, as demand for portable devices has recently increased, interest in thinner bendable glass sheets is rapidly increasing in order to fabricate flexible devices.

However, bendable glass sheets have a problem in that it is difficult to handle bendable glass sheets during processing, due to sagging and bending characteristics of thin glass sheets. Accordingly, there has been proposed a method of facilitating the handling of glass sheets during processing using existing process conditions set up for rigid glass sheets. The method includes temporarily bonding a bendable glass sheet to a carrier glass sheet so that a bonded structure is subjected to an intended process and separating the carrier glass sheet from the bendable glass sheet after the process has been completed.

The strength of the bonding between the bendable glass sheet and the carrier glass sheet should be sufficient to maintain the bonded state through the entire fabricating process of a lighting device, a display device, or the like while allowing the bendable glass sheet and the carrier glass sheet to be separated after the fabrication process of the device has been completed. The carrier glass sheet, once separated, may be reused to reduce fabrication costs.

Therefore, there has been demand for a temporary sheet bonding method able to provide optimal bonding energy and having reduced differences in bonding energy over the entire area of a bonded structure.

SUMMARY

A first aspect of the present disclosure provide a temporary sheet bonding method having reduced differences in bonding energy over the entire area of a bonded structure.

This disclosure also includes various embodiments related to a temporary sheet bonding method able to maintain the surface cleanliness of sheets.

This disclosure also includes various embodiments related to a temporary sheet bonding method able to improve the accuracy of alignment and the quality of bonding between sheets and to facilitate the handling of the sheets during bonding.

This disclosure also includes various embodiments related to a temporary sheet bonding method able to minimize the problem in which outgassing occurs from a bonded structure during the subsequent fabrication process of a device, such as a lighting device or a display device.

This disclosure also includes various embodiments related to a temporary sheet bonding method able to remove the necessity of heat treatment after bonding, thereby reducing processing time and costs.

In one or more embodiments, a temporary sheet bonding method may include: dip-coating a temporary bonding layer on a first sheet by dipping the first sheet into a bonding solution including a surfactant; and temporarily bonding a second sheet to the first sheet via the temporary bonding layer.

In some embodiments, the surfactant may include cetyltrimethylammonium bromide or poly[(3-methyl-1-vinylimidazolium chloride)-co-(1-vinylpyrrolidone)].

In some alternative embodiments, the surfactant may include poly[(3-methyl-1-vinylimidazolium chloride)-co-(1-vinylpyrrolidone)].

In some embodiments, the concentration of the surfactant in the bonding solution be in the range of 0.1 mM to 5.0 mM.

In some embodiments, the dip-coating may include performing a first movement of moving the first sheet down to immerse the first sheet in the bonding solution; performing a second movement of moving the first sheet up until the first sheet is removed from the bonding solution; and performing a third movement of moving the first sheet up and away from a surface of the bonding solution.

In one or more embodiments, wherein the second movement may include moving the first sheet up at a speed in a range of 5 mm/sec to 5.0 mm/sec.

In one or more embodiments, the temporary bonding of the second sheet to the first sheet may include: starting the temporary bonding between the second sheet and the first sheet by bringing one side of the second sheet into contact with the temporary bonding layer; gradually expanding the temporary bonding between the second sheet and the first sheet by gradually expanding the contact between the second sheet and the temporary bonding layer from the one side to the other side of the second sheet; and completing the temporary bonding between the second sheet and the first sheet on the other side of the second sheet.

In one or more embodiments, the first sheet may be thicker than the second sheet.

In one or more embodiments, each of the first sheet and the second sheet may be a glass sheet. The difference in the coefficients of thermal expansion between the first sheet and the second sheet may be at least or less than $\pm 2.0 \times 10^{-6}/°$ C.

A second aspect of this disclosure pertains to a sheet dip coating apparatus which may include: a bonding solution bath in which a bonding solution containing a surfactant is contained; a cassette into which a plurality of first sheets are to be loaded; and a driver configured to move the cassette up/down. In one or more embodiments, the driver may be configured to sequentially perform: a first movement of moving the cassette down to immerse the first sheet in the bonding solution; a second movement of moving the cassette up until the plurality of first sheets are removed from the bonding solution; and a third movement of moving the cassette up and away from a surface of the bonding solution.

A third aspect pertains to a temporary sheet bonding apparatus for temporarily bonding a second sheet to a first sheet via a temporary bonding layer. In one or more embodiments, the temporary sheet bonding apparatus may include: a support on which the second sheet and the first sheet are to be located, with a vacuum suction hole provided in a surface of the support; a position guide configured to align the second sheet in a second position when located in a second alignment position and align the first sheet in a first position when located in a first alignment position; a vacuum suction unit configured to apply vacuum to the vacuum suction hole; and a driver configured to drive the position guide. The driver may drive the position guide to be located in the second alignment position, and after the second sheet is located in the second position, drive the position guide to be located in the first alignment position. The vacuum suction unit may hold the second sheet on the support by applying vacuum to the vacuum suction hole after the second sheet is located in the second position.

In some embodiments, the second alignment position and the first alignment position of the position guide may be set such that an edge of the first sheet located in the first position is located outside an edge of the second sheet located in the second position.

According to the above-described configuration, a temporary sheet bonding method able to form a uniform coating layer of a bonding material to reduce differences in bonding energy over the entire area of a bonded structure and to facilitate processing may be provided. By optimizing the concentration and coating speed of a bonding solution, the coating layer may be formed without differences in the concentration. Due to reduced differences in the coating concentration, a joined structure having uniform bonding energy distribution may be prepared. In addition, when dip-coating is performed by immersing a cassette loaded with a plurality of sheets (e.g., 20 to 30 sheets) in a bonding solution and then removing the cassette from the bonding solution, there is an advantage in that the plurality of sheets may be easily coated with the bonding material.

In addition, the present disclosure provides embodiments, of a temporary sheet bonding method able to maintain the surface cleanliness of sheets. In one or more embodiments, only a first sheet serving as a carrier substrate may be coated with the bonding material, and the surface of a second sheet serving as a substrate for a device, such as a lighting device or a display device, may remain clean, thereby maintaining a suitable degree of cleanliness.

In addition, the present disclosure provides various embodiments of a temporary sheet bonding method able to improve the accuracy of alignment and the quality of bonding between sheets and to facilitate the handling of the sheets during bonding. In order to bond the first sheet and the second sheet, a bonding jig including a position guide aligning the first sheet and the second sheet in a bonding position and a support holding the second sheet that may otherwise be easily moved during the bonding operation, with vacuum suction and releasing the second sheet after the bonding, may be used. When the first sheet and the second sheet are bonded using the bonding jig, it is possible to improve the accuracy of alignment of the bonding, and loading/unloading handling of the second sheet and the first sheet in the bonding may be facilitated. Consequently, it is possible to minimize the creation of bubbles or warping that may occur in the bonding surface. In addition, it is possible to minimize manual handling of the sheet in the bonding operation, thereby reducing stains, such as fingerprints, and scratches that may occur on the surface of the sheet and the breakage of an edge.

In addition, the present disclosure provides various embodiments of a temporary sheet bonding method able to minimize the problem in which outgassing occurs from a bonded structure during the subsequent fabrication process of a device. In the subsequent device fabrication process, the joined structure may be exposed to a high-temperature environment and, when the bonding material evaporates at this time, a problem of outgassing may occur. In the present disclosure, a thermally stable material that is stable at high temperature and thus can be subjected to processing without a risk of outgassing was selected as the bonding material.

In addition, the present disclosure provides various embodiments of a temporary sheet bonding method able to remove the necessity of heat treatment after bonding, thereby reducing processing time and costs. Bonding energy suitable for the subsequent device fabrication process can be provided, and thus a joined structure can be used in the device fabrication process without an additional heat treatment operation. Accordingly, processing time and costs can be advantageously reduced.

The various embodiments of the methods and apparatuses of the present disclosure have other features and advantages that will be apparent from or that are set forth in greater detail in the accompanying drawings, the disclosures of which are incorporated herein, and in the following Detailed Description, which together serve to explain certain principles of the present disclosure.

DETAILED DESCRIPTION

Figures 1, 2:
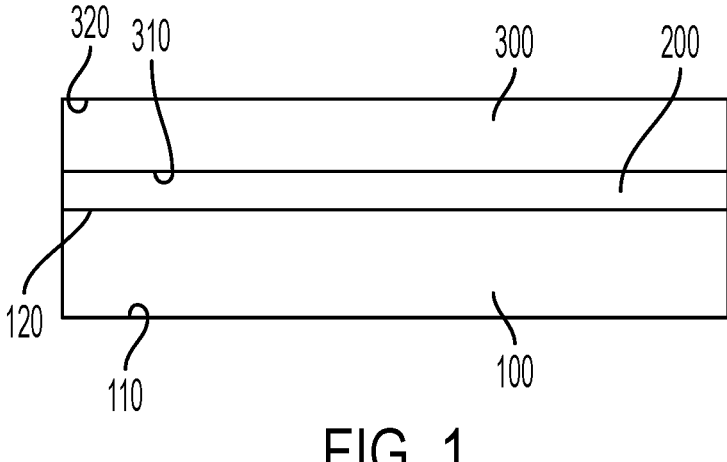
FIG. 1 is a diagram schematically illustrating a joined structure in which a first sheet and a second sheet are temporarily bonded according to an embodiment of the present disclosure.
FIG. 2 is a flowchart schematically illustrating a temporary sheet bonding method according to an embodiment of the present disclosure.

Hereinafter, embodiments of the present disclosure will be described in detail with reference to the accompanying drawings.

The present disclosure includes aspects and embodiments pertaining to a preparation process for a joined substrate having thermal stability and bonding force suitable for a device fabrication process to produce an intended device, such as a lighting device or a display device. A bonding material, a coating method, and a bonding method suitable for the device fabrication process will be described. Hereinafter, an organic light-emitting diode (OLED) device will be described as the intended device, but the present disclosure is not limited thereto.

In one or more embodiments, a material used to bond a first sheet serving as a carrier and a second sheet should be a material capable of easily bonding the first sheet and the second sheet while being stable in a high-temperature condition of about 300° C. so as to be used without an outgassing issue during processing.

In addition, various embodiments include a process that is simplified and coating that can be performed uniformly without differences in coating concentration in and between the sheets, among a variety of methods for coating the surface of a sheet with the bonding material. Without being bound by theory, it is believed that when the coating concentration on a sheet is non-uniform, some regions of the sheets may have strong bonding force, whereas other regions of the sheets may have weak bonding force. In this case, in a region having weak bonding force, the second sheet may be unintentionally separated from the first sheet during a subsequent device fabrication process. In contrast, in a region having strong bonding force, the second sheet may not be easily released from the first sheet after the device fabrication process has been completed. In some instances, a joined structure may be exposed to a high-temperature environment during the device fabrication process and thus the first sheet and the second sheet may become permanently bonded so that the first and second sheets cannot be separated.

Regarding qualities of the joined structure, one surface of the second sheet supposed to be a surface on which the subsequent device fabrication process is to be performed (e.g., a surface on which OLED devices are to be formed) should have surface quality suitable for the devices so that neither organic contaminants nor surface defects may occur. In addition, a bonding method should prevent bubbles from being trapped between the first and second sheets or warping from occurring between the first or second sheet while bonding the first and second sheets.

As described above, the various embodiments of this disclosure relate to a bonding material suitable for the subsequent high-temperature device fabrication process, a coating method and concentration for realization of uniform and appropriate bonding force, and a temporary sheet bonding method for maintaining the quality of one surface of the second sheet on which subsequent processing is to be performed and the quality of the bonding of the sheets.

Additional embodiments relate to cleaning of sheets, coating of a bonding layer, and bonding of sheets, in relation to a temporary sheet bonding method will be described.

FIG. 1 is a diagram schematically illustrating a joined structure in which a first sheet 100 and a second sheet 300 are temporarily bonded according to an embodiment of the present disclosure.

As illustrated in FIG. 1, the joined structure may include the first sheet 100, a bonding layer 200 coating the first sheet 100, and the second sheet 300. The first sheet 100 and the second sheet 300 may be bonded to each other via the bonding layer 200. The first sheet 100 may have a first surface 110 and a second surface 120 opposing the first surface 110. The first sheet 100 may have a thickness corresponding to the distance between the first surface 110 and the second surface 120. The bonding layer 200 may be formed on the second surface 120 of the first sheet 100. The second sheet 300 may have a third surface 310 and a fourth surface 320 opposing the third surface 310. The third surface 310 of the second sheet 300 may face the second surface 120 of the first sheet 100. The second sheet 300 may have a thickness corresponding to the distance between the third surface 310 and the fourth surface 320. The bonding layer 200 may be interposed between the second surface 120 of the first sheet 100 and the third surface 310 of the second sheet 300 so that the first sheet 100 and the second sheet 300 are bonded to each other. The fourth surface 320 of the second sheet 300 may be a surface on which a subsequent process is to be performed. For example, when the joined structure is used for fabrication of an organic light-emitting diode (OLED) lighting device, OLED devices may be stacked on the fourth surface 320 of the second sheet 300, and after the fabrication process of the OLED lighting device has been carried out, the first sheet 100 may be separated from the second sheet 300 on which a substrate of the OLED lighting device is stacked.

Each of the first sheet 100 and the second sheet 300 may be a thin sheet compared to the transverse and longitudinal lengths of the first surface 110 or the fourth surface 320 thereof. In addition, each of the first surface 110 and the fourth surface 320 of the first sheet 100 and the second sheet 300 may have a polygonal shape, in particular, an oblong shape. However, the present disclosure is not limited thereto. The thickness and shape of either the first sheet 100 or the second sheet 300 may vary depending on the device for which the joined structure is to be used. The first sheet 100 and the second sheet 300 may have the same shapes or different shapes according to embodiments. For example, the first sheet 100 may be greater than the second sheet 300 as in a case in which an edge of the first sheet 100 is located outside an edge of the second sheet 300 in the bonded state.

In some embodiments, the first sheet 100 and the second sheet 300 may be glass sheets. The first sheet 100 and the second sheet 300 may be sheets formed from the same material sheet or sheets formed from different materials according to embodiments. In some embodiments, the first sheet and the second sheet may be glass sheets, with the difference in the coefficients of thermal expansion (CTE) between the first sheet and the second sheet being ±2.0× $10^{-6}$/° C.

In some embodiments, the second sheet 300 may be a bendable glass sheet having a thickness of, for example, 300 μm or less, 200 μm or less, or 100 μm or less, and the first sheet 100 may be thicker than the second sheet 300. Thus, the first sheet 100 may serve as a carrier to facilitate the handling of the second sheet 300. However, the present disclosure is not limited thereto, and the first sheet 100 may have the same thickness as or be thinner than the second sheet 300. For example, even in the case that the first sheet 100 is thinner than second sheet 300, the handleability of the joined structure in which the first sheet 100 is bonded to the second sheet 300 may be improved than that of the second sheet 300. In some embodiments, the thickness of the first sheet 100 may be in a range of 0.25 mm to 1 mm.

The bonding layer 200 guarantees temporal bonding between the first sheet 100 and the second sheet 300. When the first sheet 100 and the second sheet 300 are glass sheets, it will be understood that, in a position in which the first sheet 100 and the second sheet 300 are in contact with each other without the bonding layer 200 of the present disclosure being interposed therebetween, when the first sheet 100 and the second sheet 300 are exposed to a high-temperature environment, there is risk that the first sheet 100 and the second sheet 300 may be permanently joined to each other.

In addition, it also will be understood that, in the present disclosure, the bonding layer 200 should provide bonding force having sufficient strength and it may be undesirable for the bonding layer 200 to provide bonding force weaker or stronger than that strength.

FIG. 2 is a flowchart schematically illustrating a temporary sheet bonding method according to an embodiment of the present disclosure.

In some embodiments, the temporary sheet bonding method may include: a coating operation S200 of dip-coating the temporary bonding layer 200 on the first sheet 100 by dipping the first sheet 100 into a bonding solution including a surfactant; and a temporary bonding operation S300 of temporarily bonding the second sheet 300 to the first sheet 100 via the temporary bonding layer 200. In some embodiments of these embodiments, a cleaning operation S100 of cleaning the first sheet 100 and the second sheet 300 may be performed prior to the coating operation S200 and the temporary bonding operation S300.

In some embodiments, only the first sheet 100 serving as a carrier may be coated with the bonding layer 200, and the fourth surface 320 of the second sheet 300 may not be coated with an organic matter and may be free from any physical contact that would contaminate the surface so that the fourth surface 320 may maintain the surface quality suitable for the device.

In some embodiments, the cleaning may be performed by fitting the first sheet 100 and the second sheet 300 to cassettes, respectively, and using a bath-type ultrasonic cleaning machine or an inline cleaning machine. The second sheet 300 may be subjected to the cleaning only, and the first sheet 100 may additionally pass through a dip-coating bath after the cleaning so as to be coated with the bonding layer 200.

In some embodiments, cleaning the first sheet 100 using a bath-type ultrasonic cleaning machine may include loading a cassette with a plurality of first sheets 100, immersing the cassette loaded with the plurality of first sheets 100 in a bath in which a cleaning solution is contained, and cleaning the plurality of first sheets 100 by applying ultrasonic waves (e.g., vibrations from a vibrator are transmitted to the first sheets 100 through the cleaning solution). In some embodiments, cleaning the second sheet 300 may include loading a cassette with a plurality of second sheets 300, immersing the cassette loaded with the plurality of second sheets 300 in a bath in which a cleaning solution is contained, and cleaning the plurality of second sheets 300 by applying ultrasonic waves thereto.

Instead, in some embodiments, at least one of the first sheet 100 and the second sheet 300 may be cleaned using a glass inline cleaning machine having brushing, waterjet rinsing, and air knife drying sections. In some embodiments, the glass inline cleaning machine may have at least one of a plasma cleaning section and an ultrasonic cleaning section.

A method of cleaning the first sheet 100 and a method of cleaning the second sheet 300 may be substantially the same as or different from each other. In particular, when the first sheet 100 and the second sheet 300 are implemented using different materials, different cleaning methods (e.g., different cleaning solutions) may be used.

Figure 3:
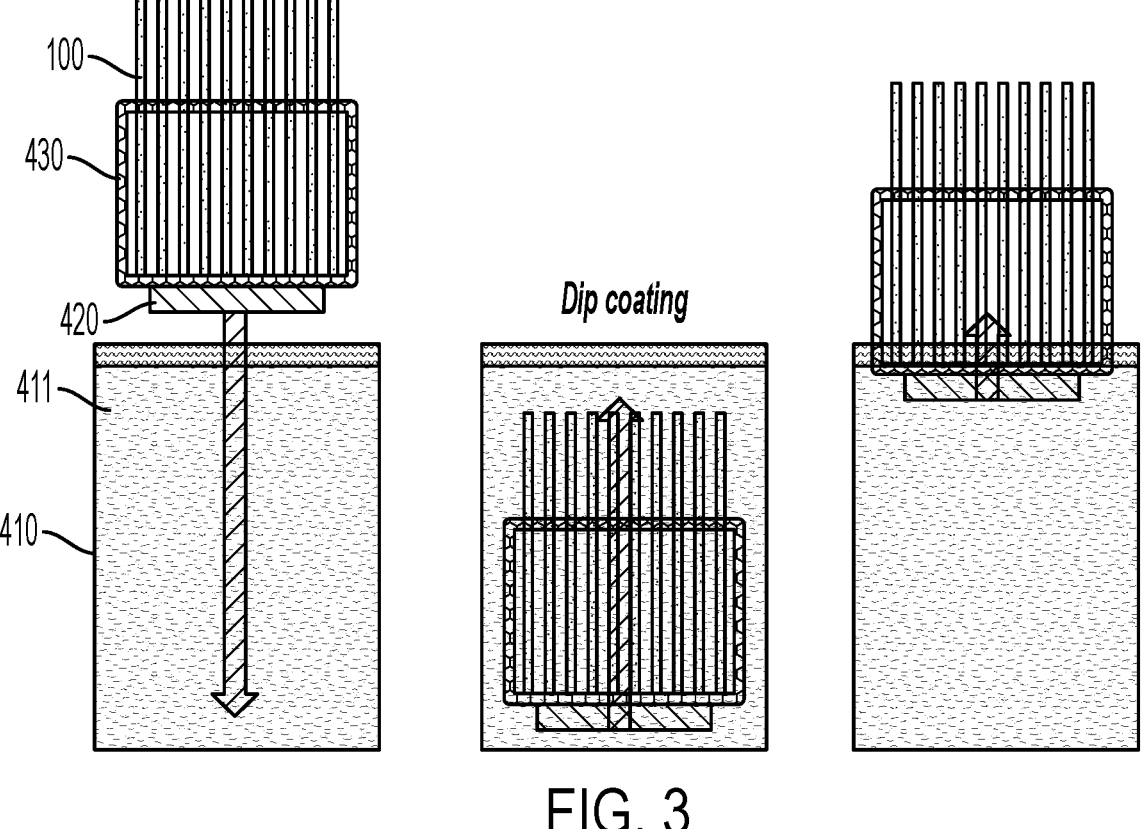
FIG. 3 is a diagram schematically illustrating a sequence by which the bonding layer coats the first sheet according to an embodiment of the present disclosure.
Figure 4:
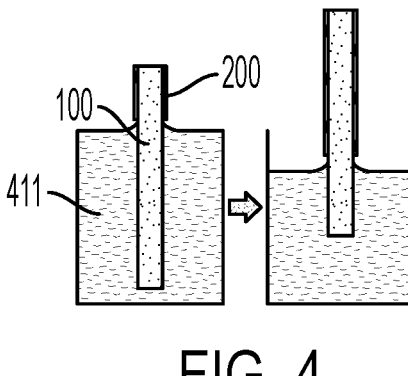
FIG. 4 is a diagram illustrating a process in which the bonding layer is formed as a monolayer coating film.

FIG. 3 is a diagram schematically illustrating a sequence by which the bonding layer 200 coats the first sheet 100 according to an embodiment of the present disclosure, and FIG. 4 is a diagram illustrating a process in which the bonding layer 200 is formed as a monolayer coating film.

In some embodiments, a bonding solution 411 used in the coating method according to an embodiment of the present disclosure may include a surfactant. In some of these embodiments, the surfactant may include cetyltrimethylammonium bromide (CTAB), a type of quaternary ammonium surfactant. Cetyltrimethylammonium bromide is stable at high temperature, and thus may be advantageously subjected to processing without outgassing during the fabrication process of OLED devices at about 300° C. Instead, in some alternative embodiments, the surfactant may include poly [(3-methyl-1-vinylimidazolium chloride)-co-(1-vinylpyrrolidone)] known as Luviquat®. Poly[(3-methyl-1-vinylimidazolium chloride)-co-(1-vinylpyrrolidone)] is stable at a temperature in the range of 300° C. to 500° C., and thus may be suitable when the first sheet is subjected to a process performed at a temperature of from 300° C. to 500° C. In both CTAB and poly[(3-methyl-1-vinylimidazolium chloride)-co-(1-vinylpyrrolidone)], coating conditions, resultant bonding energy levels, and the like are similar.

In some embodiments, the concentration of the surfactant in the bonding solution 411 may be in the range of 0.1 mM to 5.0 mM. For example, the bonding solution 411 may be prepared by adding and dissolving CTAB or poly[(3-methyl-1-vinylimidazolium chloride)-co-(1-vinylpyrrolidone)] serving as a solute at a molar concentration of 0.125 mM to and with distilled water serving as a solvent.

The coating method may be a dip-coating method. In particular, the concentration and coating speed of the bonding solution 411 may be optimized to realize bonding energy suitable for the OLED device fabrication process and realize uniform coating. The concentration and coating speed of the bonding solution 411 (in particular, a first rising speed to be described later) constitutes an important feature of the present disclosure. When these coating conditions are not met, the bonding layer intended by the present disclosure cannot be obtained. The joined structure obtained using these coating conditions may be used in the OLED device fabrication process without an additional heat treatment (e.g., pre-baking). In some embodiments, the dip-coating may be performed in a room temperature, for example, a temperature in the range of 10° C. to 40° C.

In some embodiments, the dip-coating of the bonding layer 200 may include performing a first downward movement of moving the first sheet 100 down to immerse the first sheet 100 in bonding solution 411, performing a first upward movement of moving the first sheet 100 up until the first sheet 100 is removed from the bonding solution 411, and performing a second upward movement of moving the first sheet 100 up and away from the surface of the bonding solution 411.

Performing the first downward movement of moving the first sheet 100 down may include moving the first sheet 100 down at a speed in the range of 5 mm/sec to 20 mm/sec. Performing the first upward movement of moving the first sheet 100 up may include moving the first sheet 100 up at a speed in the range of 0.5 mm/sec to 5.0 mm/sec. As described above, the speed of the first upward movement is important to realize at least one of the objectives of the present disclosure. Performing the second upward movement of moving the first sheet 100 up may include moving the first sheet 100 up at a speed in the range of 5 mm/sec to 20 mm/sec.

In some embodiments, the first upward movement may be performed to a point at which the bottom end of the first sheet 100 is just removed from the top surface of the bonding solution 411.

In some embodiments, in a case in which a plurality of first sheets 100 are loaded into a cassette, the plurality of first sheets 100 may be simultaneously dip-coated. When the plurality of first sheets 100 are loaded into a cassette 430, the plurality of first sheets 100 may be spaced apart from each other so that gaps are formed between adjacent sheets. These gaps between the first sheets 100 may be uniform.

In some embodiments, when the dip-coating is performed, the first sheet 100 may typically be in a vertical upright position, i.e., the first surface 110 and the second surface 120 to be coated are vertical surfaces, but the present disclosure is not limited thereto.

In some embodiments, the first upward movement and the second upward movement, in particular, the first upward movement, may be typically performed in a vertical direction, but the present disclosure is not limited thereto.

The present disclosure may provide a sheet dip-coating apparatus to be used in the temporary sheet bonding method according to embodiments of the present disclosure. In some embodiments, the sheet dip-coating apparatus may include: a bonding solution bath 410 in which the bonding solution 411 including the surfactant is contained; the cassette 430 into which the plurality of first sheets 100 are loaded; and a driver (not shown) moving the cassette 430 up and down. The driver may perform a first downward movement of moving the cassette 430 down to immerse the first sheet 100 in the bonding solution 411, a first upward movement of moving the cassette 430 up until the first sheet 100 is removed from the bonding solution 411, and a second upward movement of moving the cassette 430 up and away from the surface of the bonding solution 411. In some embodiments, the first downward movement is performed at a speed in the range of 5 mm/sec to 20 mm/sec, the first upward movement is performed at a speed in the range of 0.5 mm/sec to 5.0 mm/sec, and the second upward movement is performed at a speed in the range of 5 mm/sec to 20 mm/sec. In some embodiments, the first downward movement, the first upward movement, and the second upward movement, in particular, the first upward movement, may be performed at a constant speed.

An operation of drying the bonding layer 200 may be performed after coating the first sheet 100 with the bonding layer 200. In some embodiments, the bonding layer 200 may be dried by: i) performing infrared radiation (IR) heating on the bonding layer 200 at 150° C. for 400 to 600 seconds in a drying bath in which an IR lamp is disposed or ii) blowing hot air to the bonding layer 200.

Reference numeral 420 that has not been described indicates a loading arm transferring driving force from the driver to the cassette 430.

Figure 5:
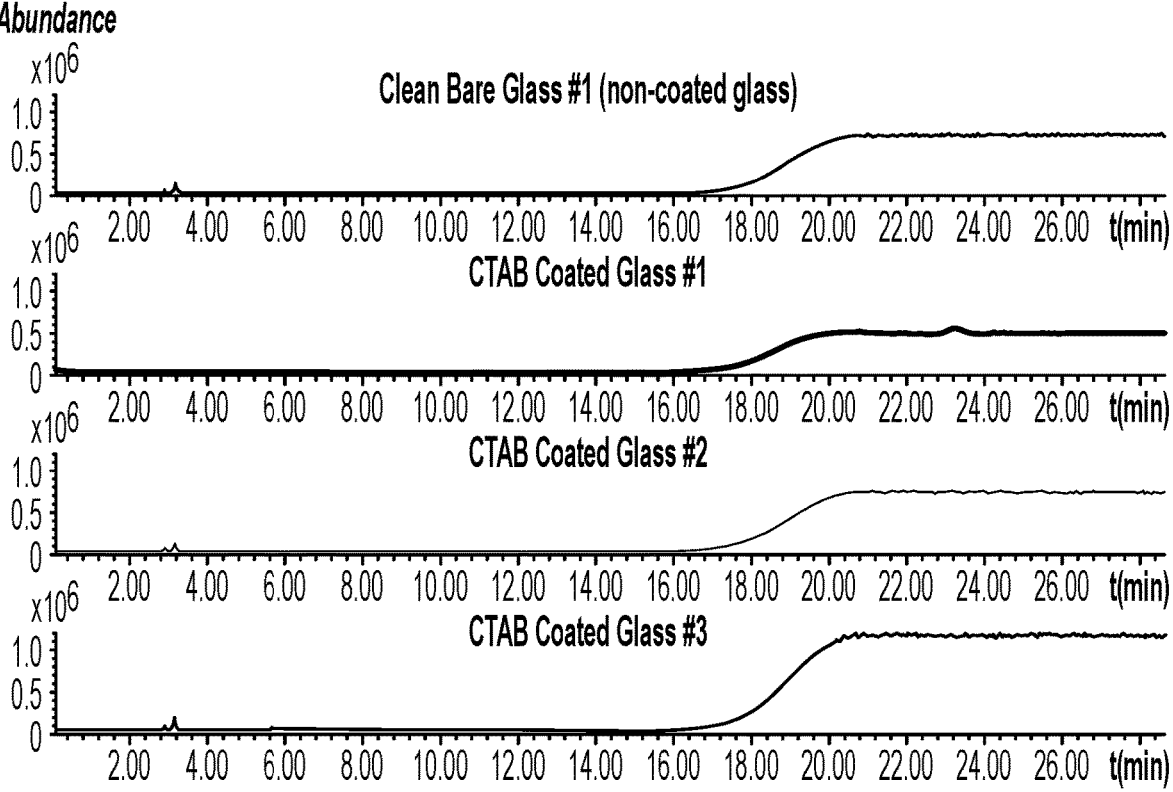
FIG. 5 is a diagram illustrating pyrolysis GC/MS analysis results for the first sheet on which the bonding layer is formed.

FIG. 5 is a diagram illustrating pyrolysis GC/MS analysis results for the first sheet 100 on which the bonding layer 200 is formed.

In a situation in which CTAB was used as the bonding material as described above, it was appreciated that, when a pyrolysis GC/MS analysis was performed in a temperature condition the same as the temperature condition (i.e., the highest temperature of 300° C.) of a fabrication process of an OLED lighting device, no CTAB component outgassing from the glass sheet coated with CTAB was detected. In the case of CTAB-coated glass, no outgassing material was detected, in the same manner as uncoated bare glass. No peak appeared in a position in which the Br-component of CTAB was detected. This means that the pyrolysis of CTAB at a temperature of 300° C. or lower causes no outgassing. Thus, it will be appreciated that, when CTAB is used as the bonding material, the fabrication process of, for example, an OLED device can be performed without a risk of outgassing.

FIG. 6 is a diagram schematically illustrating a sequence by which the first sheet 100 and the second sheet 300 are bonded according to an embodiment of the present disclosure.

In some embodiments, the temporary bonding operation of temporarily bonding the second sheet 300 to the first sheet 100 may include locating the second sheet 300 on a support 510 and locating the first sheet 100 coated with the temporary bonding layer 200 on the second sheet 300 so that the temporary bonding layer 200 is disposed between the second sheet 300 and the first sheet 100.

In some embodiments, the support 510 may be a table supporting the second sheet 300 and the first sheet 100 by allowing the second sheet 300 and the first sheet 100 to be located on the top surface thereof. The contact surface of the support 510 may be formed from a Teflon material to prevent scratches that may be caused through contact with the second sheet 300. In some embodiments, the support 510 may have a vacuum suction hole in the surface thereof to hold the second sheet 300 located on the support 510 with vacuum suction.

A bonding sequence according to an embodiment will be sequentially described.

First, a second position guide 523 is located in a second alignment position.

Afterwards, the second sheet 300 is moved to and located in a second position determined by the second position guide 523 located in the second alignment position.

Subsequently, a first position guide 521 is located in a first alignment position.

Afterwards, the first sheet 100 is moved to and located in a first position determined by the first position guide 521 located in the first alignment position.

In some embodiments, the second alignment position of the second position guide 523 and the first alignment position of the first position guide 521 may be set such that an edge of the first sheet 100 located in the first position is located outside an edge of the second sheet 300 located in the second position. In some of these embodiments, the second alignment position of the second position guide 523 and the first alignment position of the first position guide 521 may be set such that the edge of the first sheet 100 located in the first position is located outside the edge of the second sheet 300 located in the second position by, for example, 1 mm to 5 mm. However, these numerical values are illustrative only, and the present disclosure is not limited to specific numerical values.

In some embodiments, the second position guide 523 and the first position guide 521 may be the same position guide, which may be moved from the second alignment position to the first alignment position so that the same position guide is located in the first alignment position.

In some embodiments, at least two edges of the second sheet 300 located in the second position may be in contact with the second position guide 523, whereas at least two edges of the first sheet 100 located in the first position may be in contact with the first position guide 521.

In some embodiments, the temporary bonding operation of temporarily bonding the second sheet 300 to the first sheet 100 may include: starting the temporary bonding between the second sheet 300 and the first sheet 100 by bringing one side of the second sheet 300 into contact with the temporary bonding layer 200; gradually expanding the temporary bonding between the second sheet 300 and the first sheet 100 by gradually expanding the contact between the second sheet 300 and the temporary bonding layer 200 from the one side to the other side of the second sheet 300; and completing the temporary bonding between the second sheet 300 and the first sheet 100 on the other side of the second sheet 300.

A bonding sequence according to an embodiment will be sequentially described.

First, the position guide is moved inward by 2 mm so that the second sheet 300 will be bonded in a position inside the first sheet 100, for example, by 2 mm.

Afterwards, the second sheet 300 is placed above the support 510.

Subsequently, the second sheet 300 is moved to the second position to be aligned in an accurate bonding position. For example, the second sheet 300 may be smoothly pushed in a diagonal direction from the top left corner to the bottom right corner of the support 510 to be aligned in a second position. Thereafter, a vacuum suction unit is turned on to hold the second sheet 300 on the support 510 with vacuum suction, thereby preventing the second sheet 300 from moving.

Afterwards, when the second sheet 300 is fixed to the support 510, the position guide is moved to the first alignment position which is outside the second alignment position by 2 mm.

Subsequently, the bonding includes placing the first sheet 100 coated with the bonding layer 200 on the second sheet 300. Here, the first sheet 100 is slowly placed on the second sheet 300 so that the bonding is started at one corner and the bonding area is gradually expanded toward the opposite corner. Referring to FIG. 6, for example, the bonding between the first sheet 100 and the second sheet 300 may be started at the right bottom corner, expanded in a diagonal direction toward the top left corner, and completed at the top left corner. In this regard, the bottom right corner (of the temporary bonding layer 200) of the first sheet 100 is first in contact with the second sheet 300, and then, the top left corner is slowly placed down, so that the top left corner is the last to come into contact with the second sheet 300.

When the bonding is performed in this manner, the creation of bubbles and warping during the bonding may be minimized. In addition, the fourth surface 320 of the second sheet 300 remains fixed to the support 510 during the bonding and has no contact, so that the surface of the fourth surface 320 may maintain the original quality.

The present disclosure may provide a temporary sheet bonding apparatus to be used in the temporary sheet bonding method.

In some embodiments, the temporary sheet bonding apparatus may include: the support 510 on which the second sheet 300 and the first sheet 100 are located, with the vacuum suction hole provided in the surface of the support 510; and a position guide aligning the second sheet 300 in the second position when located in the second alignment position and aligning the first sheet 100 in the first position when located in the first alignment position.

In addition, the temporary sheet bonding apparatus may include the vacuum suction unit applying vacuum to the vacuum suction hole to hold or release the second sheet 300. In some embodiments, after the second sheet 300 is located in the second position, the vacuum suction unit may hold the second sheet 300 on the support 510 by applying vacuum to the vacuum suction hole.

In addition, the temporary sheet bonding apparatus may include the driver (not shown) moving the position guide. In some embodiments, the driver may move the position guide to be located in the second alignment position, and after the second sheet is located in the second position, move the position guide to be located in the first alignment position.

In some embodiments, the second alignment position and the first alignment position of the position guide may be set such that an edge of the first sheet 100 located in the first position is located outside an edge of the second sheet 300 located in the second position. In some of these embodiments, the second alignment position and the first alignment position of the position guide may be set such that the edge of the first sheet 100 located in the first position is located outside the edge of the second sheet 300 located in the second position by, for example, 1 mm to 5 mm. In some embodiments, when the position guide is in the second alignment position, the position guide may be in contact with at least two edges of the second sheet 300 located in the second position. When the position guide is in the first alignment position, the position guide may be in contact with at least two edges of the first sheet 100 located in the first position.

In addition, the temporary sheet bonding apparatus may include a carrier (not shown) moving the sheets.

Figures 6A, 6B, 6C:
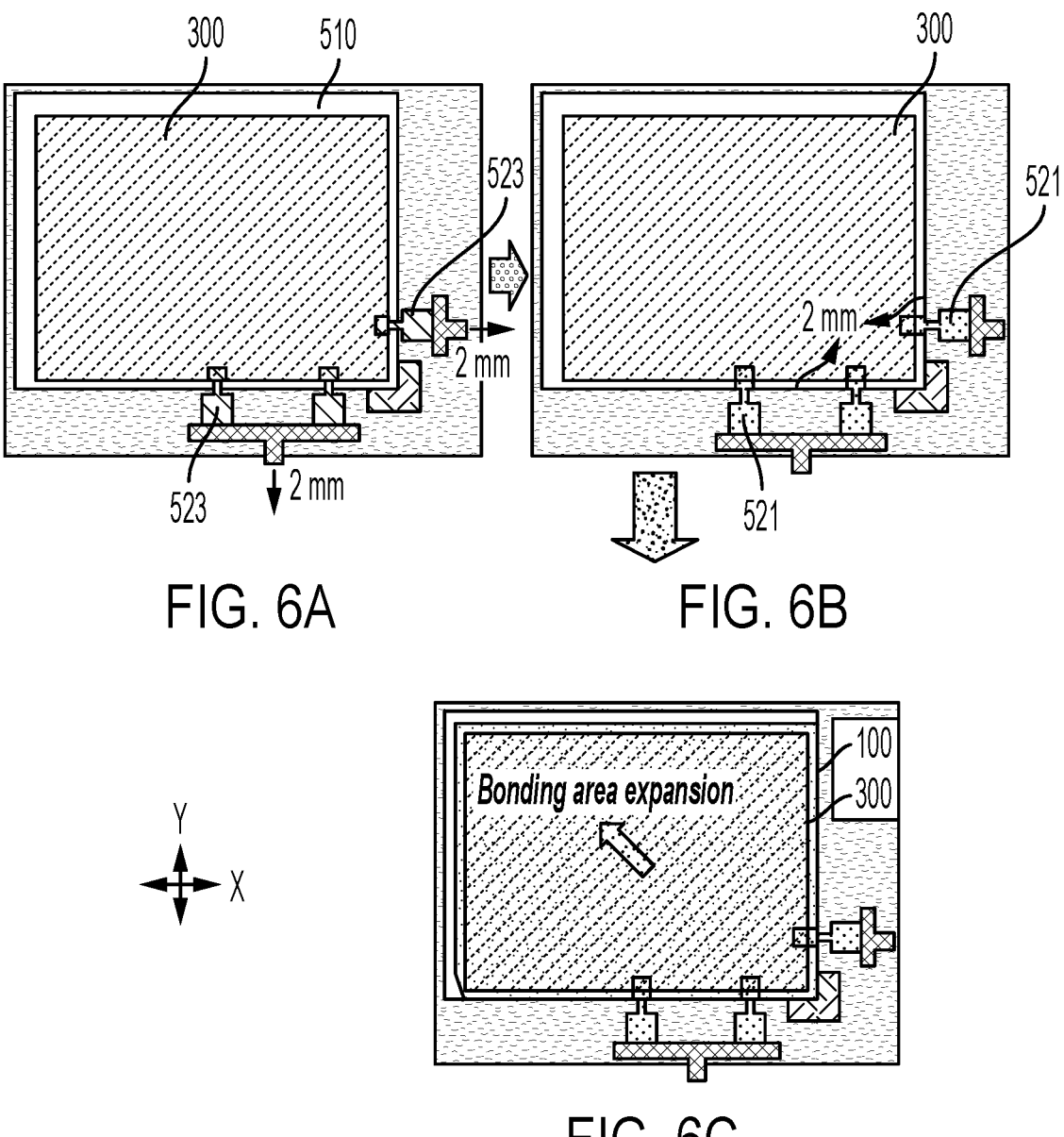
FIGS. 6A-6C are diagrams schematically illustrating a sequence by which the first sheet and the second sheet are bonded according to an embodiment of the present disclosure.

In some embodiments, the position guide may include a plurality of position guide bodies configured to move respectively and independently. Referring to FIGS. 6A-6C, for example, the position guide may include two position guide bodies. The first position guide body may come into contact with a long side of the first sheet 100 or the second sheet 300, and move in the Y axis direction normal to the long side. In addition, the second position guide body may come into contact with a short side of the first sheet 100 or the second sheet 300, and move in the X axis direction normal to the short side.

In some embodiments, each of the position guide bodies may include at least one tip configured to come into contact with the first sheet 100 and the second sheet 300. FIGS. 6A-6C illustrates an embodiment in which the first position guide body has two tips and the second position guide body has one tip.

It is possible to effectively handle and bond the second sheet 300 and the first sheet 100 using the above-described temporary sheet bonding apparatus.

Figures 7A, 7B, 8:
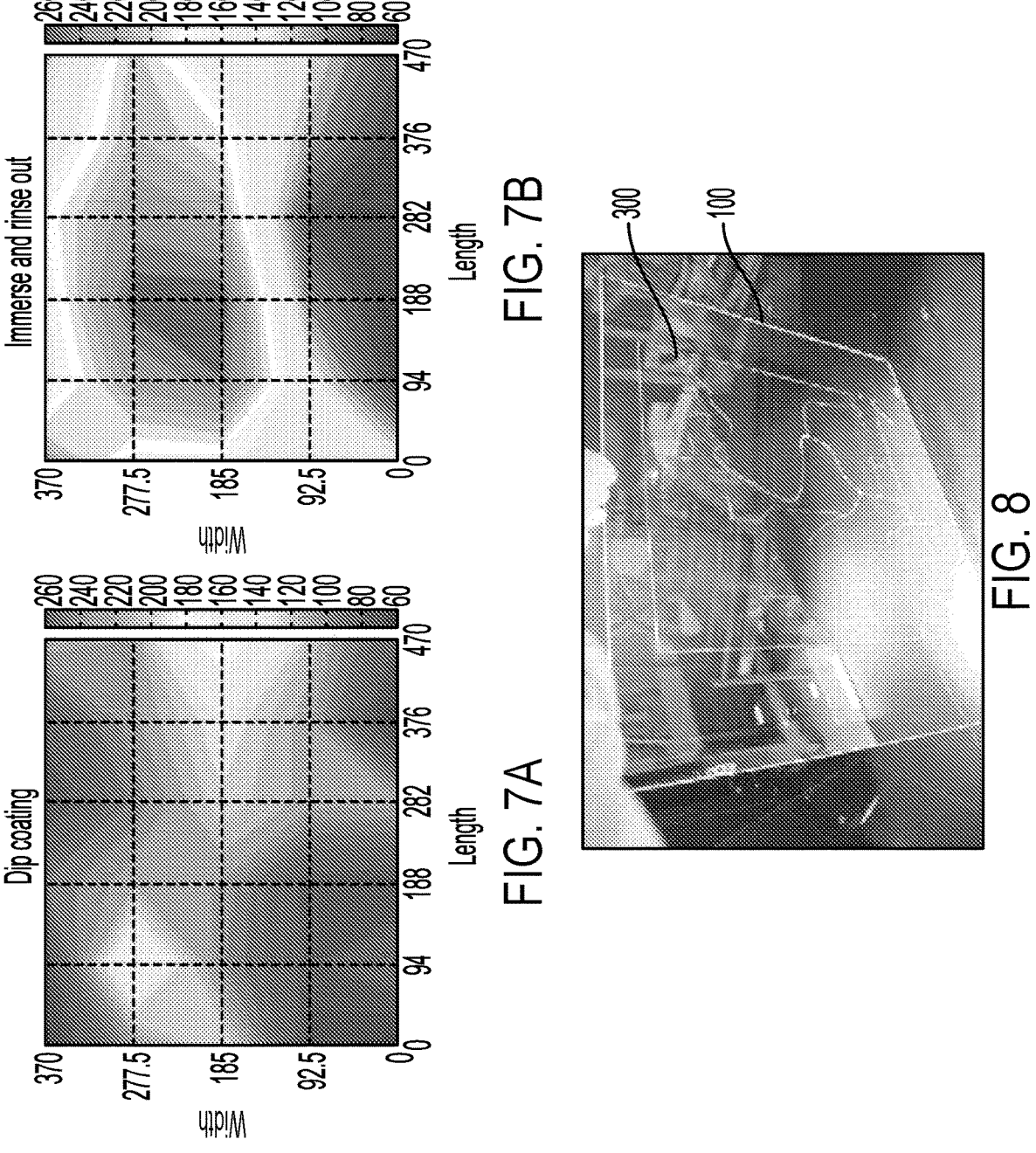
FIGS. 7A and 7B are diagrams illustrating bonding energy distributions of joined structures produced by a method according to an embodiment of the present disclosure and an immersion and rinse out method of the related art.
FIG. 8 is an image illustrating cracks occurring in the second sheet when the first sheet and the second sheet having different compositions and CTEs were bonded and then baked at 250° C. for 30 minutes.

FIGS. 7A and 7B are diagrams illustrating bonding energy distributions of joined structures produced by a method according to an embodiment of the present disclosure and an immersion and rinse out method of the related art.

According to the coating method according to an embodiment of the present disclosure, it is possible to uniformly coat the sheet with the bonding layer 200 and reduce differences in bonding energy.

According to the coating method of the related art, a sheet is immersed in a bonding solution, removed from the bonding solution, and then rinsed out. In this case, in the operation of rinsing the bonding solution out, the bonding solution flows from top to bottom. This may reduce the coating concentration on the upper portion of the sheet and increase the coating concentration on the lower portion of the sheet on which the bonding solution is enriched, thereby causing differences in bonding energy, which are problematic.

In contrast, when the concentration and speed are optimized using the dip-coating method according to an example of the present disclosure, the bonding layer 200 may uniformly coat the sheet. In some embodiments, the concentration of the bonding solution in the present disclosure may be lower than the concentration of the bonding solution in the immersion and rinse out method of the related art.

The bonding energy distributions in the sheets coated with the bonding layer 200 by the dip-coating method according to an example of the present disclosure and the immersion and rinse out method of the related art were analyzed. As illustrated in FIG. 7A, it will be appreciated that the overall bonding energy distribution of the joined structure prepared by the dip-coating method was uniform. In contrast, in the joined structure prepared by the immersion and rinse out method of the related art, the upper portion of the sheet had higher bonding energy and the lower portion of the sheet had lower bonding energy since the bonding solution was enriched and increased the coating concentration on the lower portion. In some cases, the coating concentration on the lower portion was twice the coating concentration on the higher portion.

In the joined structure prepared by the temporary bonding method according to an example of the present disclosure, the bonding energy between the first sheet 100 and the second sheet 300 temporarily bonded may be in the range of 90 mJ/m$^2$ to 150 mJ/m$^2$. For example, the speed of the dip-coating and the concentration of the coating solution may be optimized to be 1 mm/sec and 0.125 mM, respectively. When a joined structure is prepared in this coating condition, bonding energy was on the order of 100 mJ/m$^2$.

FIG. 8 is an image illustrating cracks occurring in the second sheet 300 when the first sheet 100 and the second sheet 300 having different compositions and CTEs were bonded and then baked at 250° C. for 30 minutes.

When there is a CTE mismatch between the first sheet 100 and the second sheet 300, breakage may occur in a high-temperature process of 100° C. or higher. Accordingly, in order to prevent this problem, the difference in the CTE between the first sheet 100 and the second sheet 300 may be ±2.0×10$^{-6}$/° C.

What is claimed is:

1. A temporary sheet bonding method comprising:
dip-coating a temporary bonding layer on a first sheet by dipping the first sheet into a bonding solution comprising a surfactant; and
temporarily bonding a second sheet to the first sheet via the temporary bonding layer, wherein the dip-coating comprises:
performing a first movement of moving the first sheet down to immerse the first sheet in the bonding solution;
performing a second movement of moving the first sheet up until the first sheet is removed from the bonding solution; and
performing a third movement of moving the first sheet up and away from a surface of the bonding solution wherein the first movement comprises moving the first sheet down at a speed in a range of 5 mm/sec to 20 mm/sec, wherein the second movement comprises moving the first sheet up at a speed in a range of 5 mm/sec to 5.0 mm/sec, and wherein the third movement comprises moving the first sheet up at a speed in a range of 5 mm/sec to 20 mm/sec.

2. The temporary sheet bonding method of claim 1, wherein the surfactant comprises cetyltrimethylammonium bromide or poly[(3-methyl-1-vinylimidazolium chloride)-co-(1-vinylpyrrolidone)].

3. The temporary sheet bonding method of claim 2, wherein the concentration of the surfactant in the bonding solution is in a range of 0.1 mM to 5.0 mM.

4. The temporary sheet bonding method of claim 1, wherein bonding force between the first sheet and the second sheet temporarily bonded to each other is in a range of 95 mJ/m$^2$ to 105 mJ/m$^2$.

5. The temporary sheet bonding method of claim 1, wherein the dip-coating comprises loading a plurality of first sheets into a first cassette, and subsequently simultaneously dip-coating the plurality of first sheets loaded into the first cassette.

6. The temporary sheet bonding method of claim 1, wherein the temporary bonding of the second sheet to the first sheet comprises:
locating the second sheet on a support; and
locating the first sheet coated with the temporary bonding layer on the second sheet such that the temporary bonding layer is disposed between the second sheet and the first sheet, thereby temporarily bonding the second sheet to the first sheet.

7. The temporary sheet bonding method of claim 6, wherein the locating of the second sheet on the support comprises:
locating a second position guide in a second alignment position; and
moving the second sheet to a second position determined by the second position guide located in the second alignment position, thereby locating the second sheet in the second position, and
wherein the locating of the first sheet on the second sheet comprises:
locating a first position guide in a first alignment position; and
moving the first sheet to a first position determined by the first position guide located in the first alignment position, thereby locating the first sheet in the first position.

8. The temporary sheet bonding method of claim 7, wherein at least two edges of the second sheet located in the second position come into contact with the second position guide located in the second alignment position, and
at least two edges of the first sheet located in the first position come into contact with the first position guide located in the first alignment position.

9. The temporary sheet bonding method of claim 1, wherein the temporary bonding of the second sheet to the first sheet comprises:
starting the temporary bonding between the second sheet and the first sheet by bringing one side of the second sheet into contact with the temporary bonding layer;
gradually expanding the temporary bonding between the second sheet and the first sheet by gradually expanding the contact between the second sheet and the temporary bonding layer from the one side to the other side of the second sheet; and
completing the temporary bonding between the second sheet and the first sheet on the other side of the second sheet.

10. The temporary sheet bonding method of claim 1, wherein the first sheet is thicker than the second sheet.

11. The temporary sheet bonding method of claim 1, wherein each of the first sheet and the second sheet is a glass sheet.

12. The temporary sheet bonding method of claim 11, wherein a difference in the coefficients of thermal expansion between the first sheet and the second sheet is ±2.0×10$^{-6}$/° C.

* * * * *